(12) United States Patent
Aoyama et al.

(10) Patent No.: US 7,399,020 B2
(45) Date of Patent: Jul. 15, 2008

(54) SOUND INSULATION STRUCTURE FOR TRACTOR

(75) Inventors: Kenichi Aoyama, Sakai (JP); Yutaka Kitano, Kawachinagano (JP); Tomofumi Fukunaga, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/714,082

(22) Filed: Mar. 5, 2007

(65) Prior Publication Data

US 2008/0079281 A1  Apr. 3, 2008

(30) Foreign Application Priority Data

Sep. 29, 2006  (JP) ............... 2006-266924

(51) Int. Cl.
  *B62D 33/00* (2006.01)
(52) U.S. Cl. .................................... 296/39.3
(58) Field of Classification Search ............... 296/39.3, 296/1.03, 190.08, 190.11, 192; 181/204, 181/290, 256
See application file for complete search history.

(56) References Cited

U.S. PATENT DOCUMENTS

| | | | | | |
|---|---|---|---|---|---|
| 2,116,771 | A | * | 5/1938 | Seaman | 296/39.3 |
| 2,223,395 | A | * | 12/1940 | Van Buren | 296/39.3 |
| 4,854,278 | A | * | 8/1989 | Honecker | 181/204 |
| 5,005,898 | A | * | 4/1991 | Benedetto et al. | 296/39.3 |
| 5,153,388 | A | * | 10/1992 | Wittenmayer et al. | 181/290 |
| 5,817,408 | A | * | 10/1998 | Orimo et al. | 296/39.3 |
| 6,102,465 | A | * | 8/2000 | Nemoto et al. | 296/39.3 |
| 6,305,494 | B1 | * | 10/2001 | Pfaffelhuber et al. | 181/286 |
| 6,524,691 | B2 | * | 2/2003 | Sugawara et al. | 181/290 |
| 6,550,571 | B1 | * | 4/2003 | Kimura et al. | 181/204 |
| 6,554,101 | B2 | * | 4/2003 | Watanabe et al. | 181/290 |
| 6,561,562 | B1 | * | 5/2003 | Hesch | 296/39.3 |
| 7,080,712 | B2 | * | 7/2006 | Tsuiki et al. | 296/39.3 |
| 2006/0151222 | A1 | * | 7/2006 | Tinti | 296/39.3 |

FOREIGN PATENT DOCUMENTS

| | | |
|---|---|---|
| JP | 11-278040 | 10/1999 |
| JP | 2001-122165 | 5/2001 |
| JP | 2006-036073 | 2/2006 |

* cited by examiner

*Primary Examiner*—Kiran B. Patel
(74) *Attorney, Agent, or Firm*—The Webb Law Firm

(57) ABSTRACT

A tractor includes a plurality of wheels; a vehicle body frame supported by the wheels; an engine supported by the vehicle body frame; an engine hood for covering the engine; a cabin disposed rearwardly of the engine hood; an engine hood support frame for supporting the engine hood; wherein a gap is formed between the engine hood and the cabin and a gap is formed between the engine hood support frame and the cabin; an engine side sound insulating wall closing a rearward opening of the engine hood; a cabin side sound insulating wall provided to the cabin in opposition to the engine side sound insulating wall wherein the engine side sound insulating wall and the cabin side sound insulating wall defining a gap therebetween which opens to exterior space outside the cabin.

5 Claims, 5 Drawing Sheets

SOUND INSULATION STRUCTURE FOR TRACTOR

BACKGROUND OF THE INVENTION

The present invention relates to a tractor having a cabin rearwardly of an engine hood of an engine section relative to a vehicle body.

A tractor of this type is known from e.g. JP2001-122165. This tractor includes an engine hood, a cabin, an extension portion provided in a rear end plate and a partition wall plate bolt-connected to this extension portion. The extension portion of the rear end plate and the partition wall plate partition an engine room from a driving section, so as to restrict transmission of noise to the driving section. The extension portion of the rear end plate extends to a position upwardly of the engine room so as to partition the engine room from the driving section, thus providing sound insulation for the driving section.

When the above-described prior art is adopted, in order to obtain good sound insulation for the cabin, it is necessary to provide good precision in the partitioning between the inside of the engine hood and the cabin and restriction of the noise transmission. If this was to be done, this would impose difficulty in the manufacture of the partition wall, the cabin, etc. so that the partition wall, the cabin, etc. may obtain good sealing performance and sound insulating performance.

SUMMARY OF THE INVENTION

The object of the present invention is to provide a tractor having good sound insulating performance for its driving section and being advantageous in its manufacture.

A tractor, according to the present invention, comprises:
 a plurality of wheels;
 a vehicle body frame supported by the wheels;
 an engine supported by the vehicle body frame;
 an engine hood for covering the engine;
 a cabin disposed rearwardly of the engine hood;
 an engine hood support frame for supporting the engine hood wherein a gap is formed between the engine hood and the cabin and a gap is formed between the engine hood support frame and the cabin;
 an engine side sound insulating wall closing a rearward opening of the engine hood;
 a cabin side sound insulating wall provided to the cabin in opposition to the engine side sound insulating wall wherein the engine side sound insulating wall and the cabin side sound insulating wall defining a gap therebetween which opens to exterior space outside the cabin.

DETAILED DESCRIPTION OF PREFERRED EMBODIMENTS

Embodiments of the invention will be described next with reference to the accompanying drawings.

Figure 1:
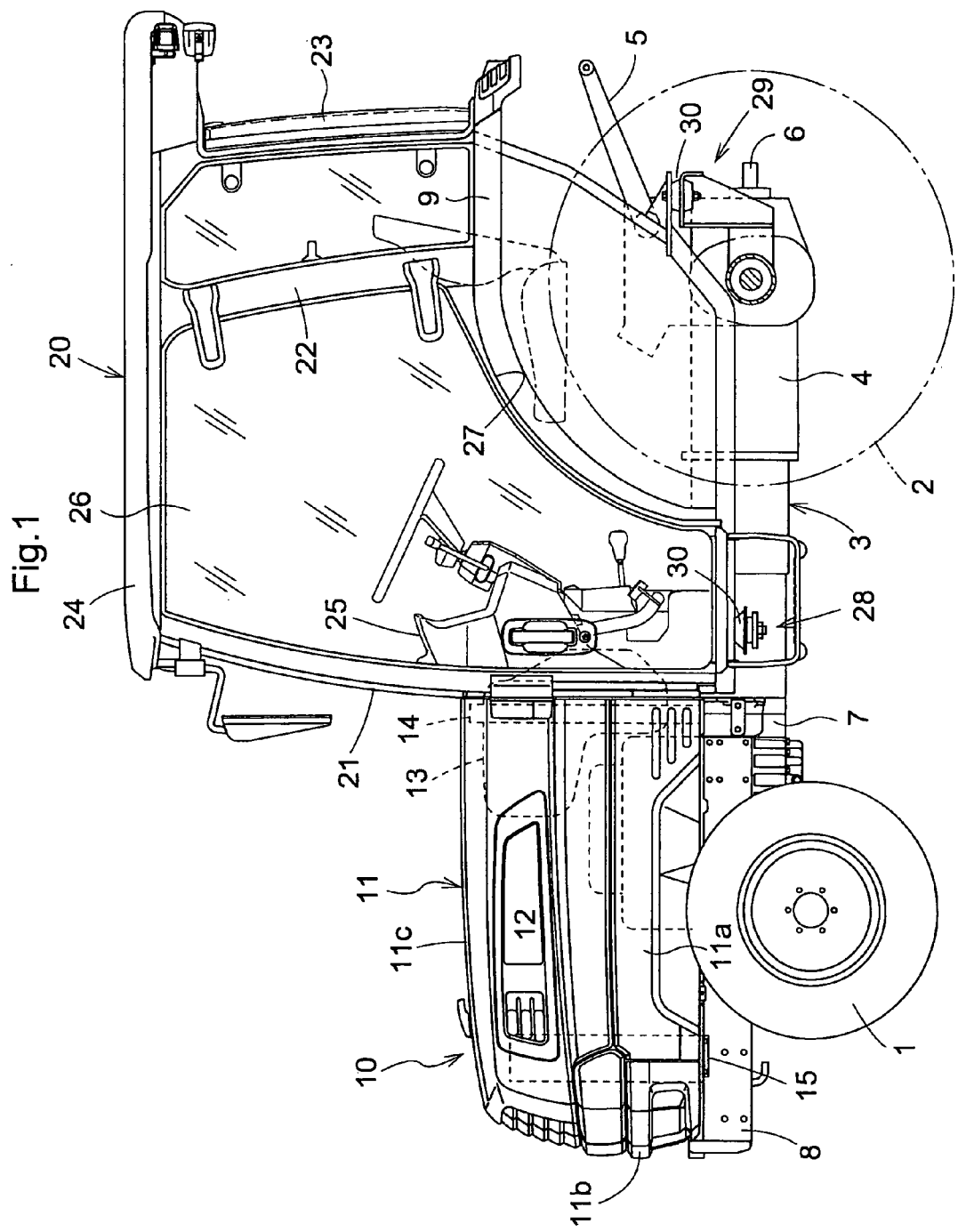
FIG. 1 is a general side view of a tractor.

FIG. 1 is a general side view of a tractor relating to an embodiment of the present invention. As shown, the tractor relating to the embodiment of the invention includes a self-propelling vehicle body having a pair of right and left steerable and drivable front wheels 1, 1 and a pair of right and left drivable rear wheels 2, 2, an engine section 10 having an engine hood 11 provided at a front portion of a vehicle body frame 3 of this self-propelling vehicle body, a driving section having a cabin 20 provided rearwardly of the engine hood 11 relative to the vehicle body, lift arms 5 provided on opposed lateral sides of an upper portion of a transmission case 4 constituting a rear portion of the vehicle body frame 3, and a power takeoff (PTO) shaft 6 provided at a rear portion of the transmission case 4.

To the rear portion of the vehicle body of this tractor, various work implements can be operably connected to be liftable and drivable, thus rendering the tractor into various work vehicles. For instance, a rotary plow implement can be connected to be lifted up/down to the rear portion of the vehicle body via a link mechanism utilizing the pair of right and left lift arms 5, 5 and power can be transmitted to this rotary plow implement via the PTO shaft 6. In this case, the tractor is provided as a riding type plowing machine.

The vehicle body frame 3 includes an engine 12, a transmission case 7 connected to a rear portion of the engine 12, the transmission case 4 connected to a rear portion of the transmission case 7, and a front wheel frame 8 extending forwardly relative to the vehicle body from under the engine 12.

Figure 2:
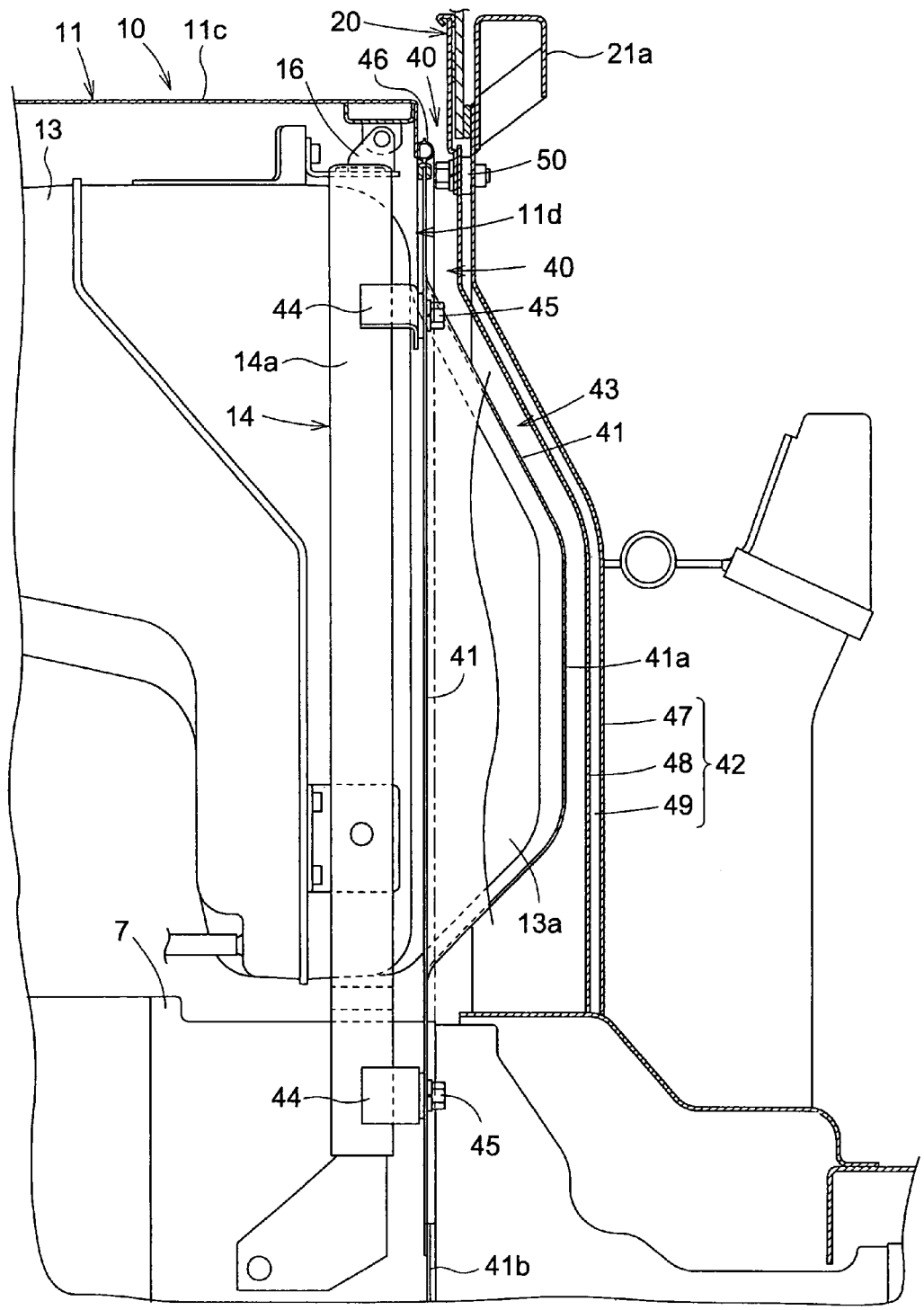
FIG. 2 is a side view in vertical section showing a rear portion of an engine section and a front portion of a cabin.
Figure 5:
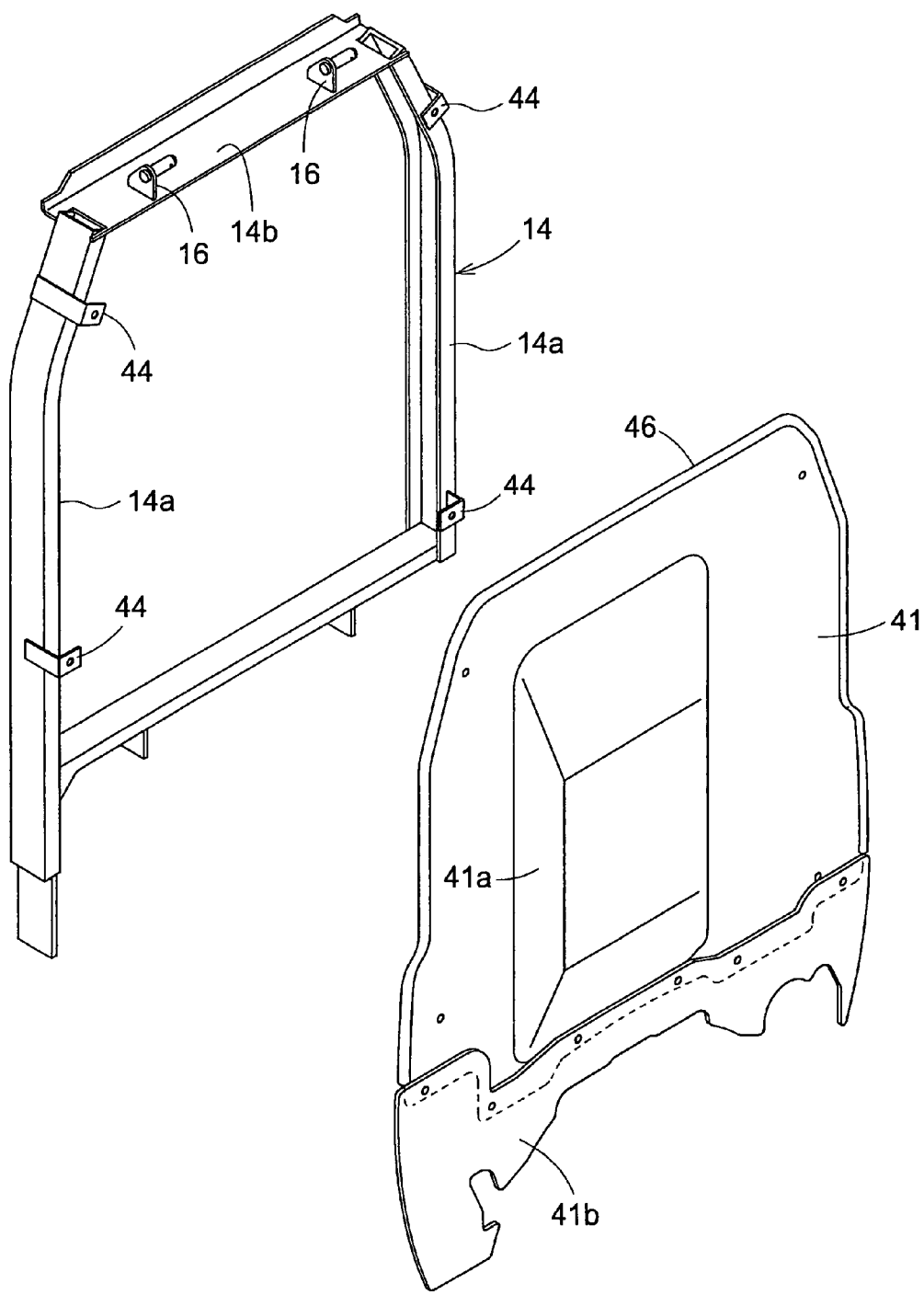
FIG. 5 is a perspective view showing a rear engine hood support frame and a sound insulting plate.

The engine section 10 includes the engine hood 11 and includes also the engine 12 disposed inside this engine hood 11, and an engine fuel tank 13 disposed rearwardly and upwardly of the engine 12. The engine hood 11 includes a pair of right and left lower hoods 11a, 11a, a single front hood 11b, and a single upper hood 11c. The right and left lower hoods 11a, 11a are detachably supported to a rear engine hood support frame 14 (see FIGS. 2 and 5) having a lower end thereof connected to the transmission case 7 and also to a front support frame 15 (see FIG. 1) provided at a front portion of the front wheel frame 8. As shown in FIG. 2, a rear end side upper portion of the upper hood 11c is pivotally connected to a support portion 16 located at an upper end portion of the rear engine hood support frame 14, so that the upper hood 14c is vertically pivoted about an a lateral axis included in the support portion 16 to be opened/closed. As shown in FIG. 5, the rear engine hood support frame 14 includes a pair of right and left vertical frame portions 14a oriented vertical relative to the vehicle body and having lower ends thereof connected to the transmission case 7 and a lateral frame portion 14b oriented lateral relative to the vehicle body and interconnecting respective upper ends of the right and left vertical frame portions 14a, so that the rear engine support frame 14 as a whole presents a portal shape as viewed along the fore and aft direction of the vehicle body.

The cabin 20 includes a front wall 21, a pair of right and left lateral walls 22, 22, a rear wall 23 and a top plate 24. The front wall 21 includes a driver's panel 25 provided on the inner face side of the front wall 21 and at a center of the lower portion of the front wall 21 relative to the right/left direction. The front wall 21 and the rear wall 23 include transparent plates constituting most parts of the front wall 21 and the rear wall 23. The right and left lateral wall 22 include an entrance/exit door 26 and a curved lower edge portion 27. The curved lower edge portion 27 has a curved shape extending along a rear wheel fender 9 so that the lateral wall 22 may be disposed upwardly of the rear wheel fender 9. The entrance/exit door 26 is opened/closed as being pivoted about a vehicle-body-wise vertical axis located at a rear end of this entrance/exit door 26.

As shown in FIG. 1, the cabin 20 is connected to the vehicle body 3 via a pair of front connecting portions 28 disposed so as to be located on opposed lateral outer sides of the transmission case 7 and a pair of rear connecting portions 29 disposed so as to be located on the opposed lateral sides of the rear portion of the transmission case 4. The pair of right and left front connecting portions 28 and the pair of right and left rear connecting portions 29 include damper rubbers 30 interposed between vehicle side cabin attaching members included in the transmission case 7 and the transmission case 4 and cabin side connecting members included in the cabin, so that the cabin 20 is connected to the vehicle body frame 3 with transmission of vibration from the vehicle body frame 3 to the cabin 20 being lessened.

Figure 3:
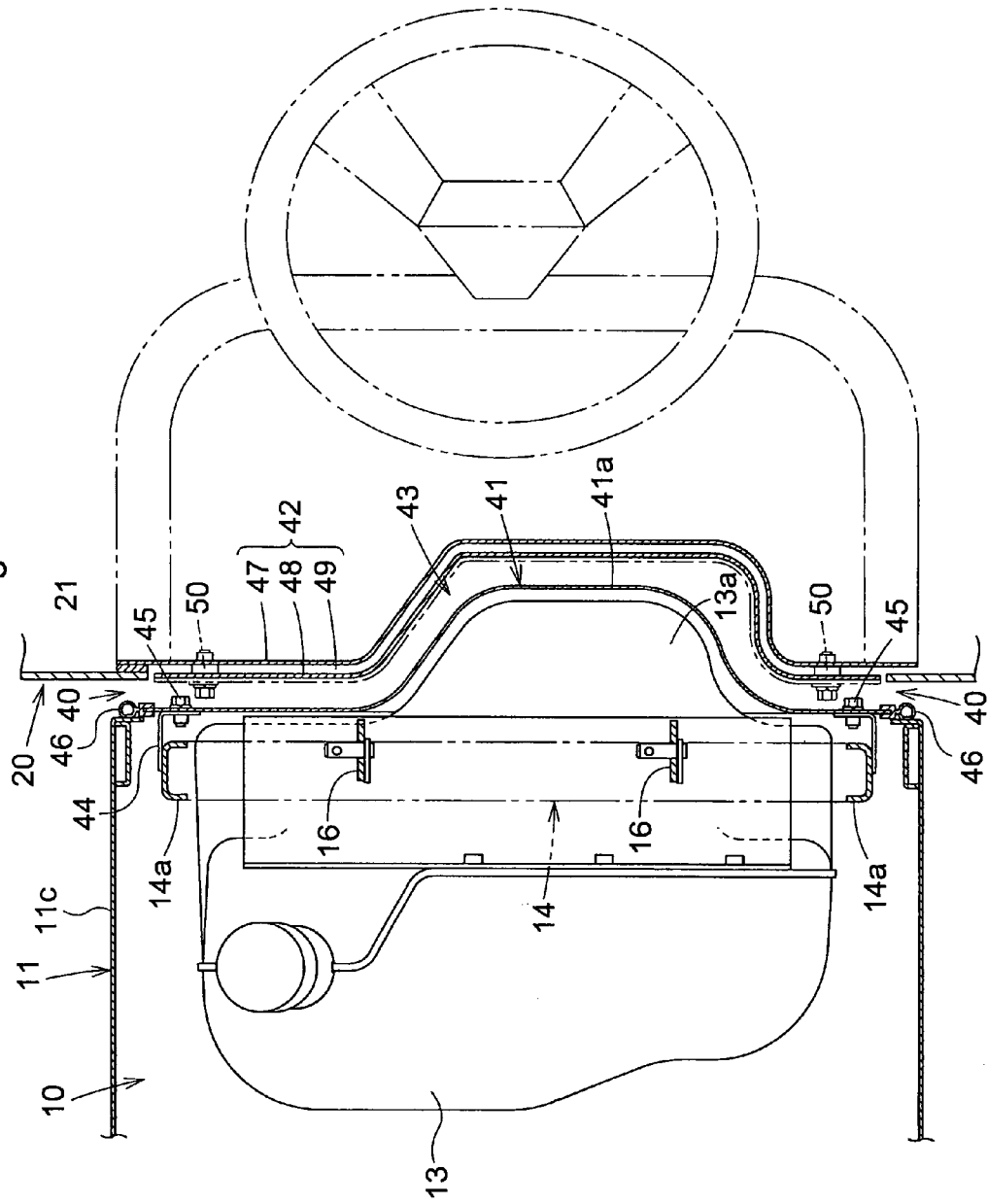
FIG. 3 is a plan view in section showing the rear portion of the engine section and the front portion of the cabin.

FIG. 2 is a side view in vertical section showing a front portion of the cabin 20 and a rear portion of the engine section 10. FIG. 3 is a plan view in section showing the front portion of the cabin 20 and the rear portion of the engine section 10. As shown in these drawings, a gap 40 is provided between the engine section 10 and the cabin 20. At a rear portion of the engine section 10, there is provided an engine section side sound insulating wall 41. The front wall 21 of the cabin 20 includes a cabin side sound insulating wall 42 provided in opposition to the engine section side sound insulating wall 41. A gap 43 is provided between the engine section side sound insulating wall 41 and the cabin side sound insulating wall 42. The arrangements provide sound proof for the cabin 20 so as to restrict noise transmission from the engine section 10 to the cabin 20.

More particularly, the gap 40 is a gap provided among the engine hood 11, the rear engine hood support frame 14 and the cabin 20. This gap 40 restricts transmission of vibration from the engine hood 11 to the cabin 20 and also restricts transmission of vibration from the rear engine hood support frame 14 to the engine 20.

The engine section side sound insulating wall 41 of the engine section 10 is comprised of an iron plate connected via connecting screws 45 to a pair of upper and lower stays 44, 44 (see FIGS. 2 and 5) included in a pair of right and left vertical frame portions 14a of the rear engine hood support frame 14. For forming this engine section side sound insulating wall 41, aside from iron, any other metal or resin can also be used.

Figure 4:
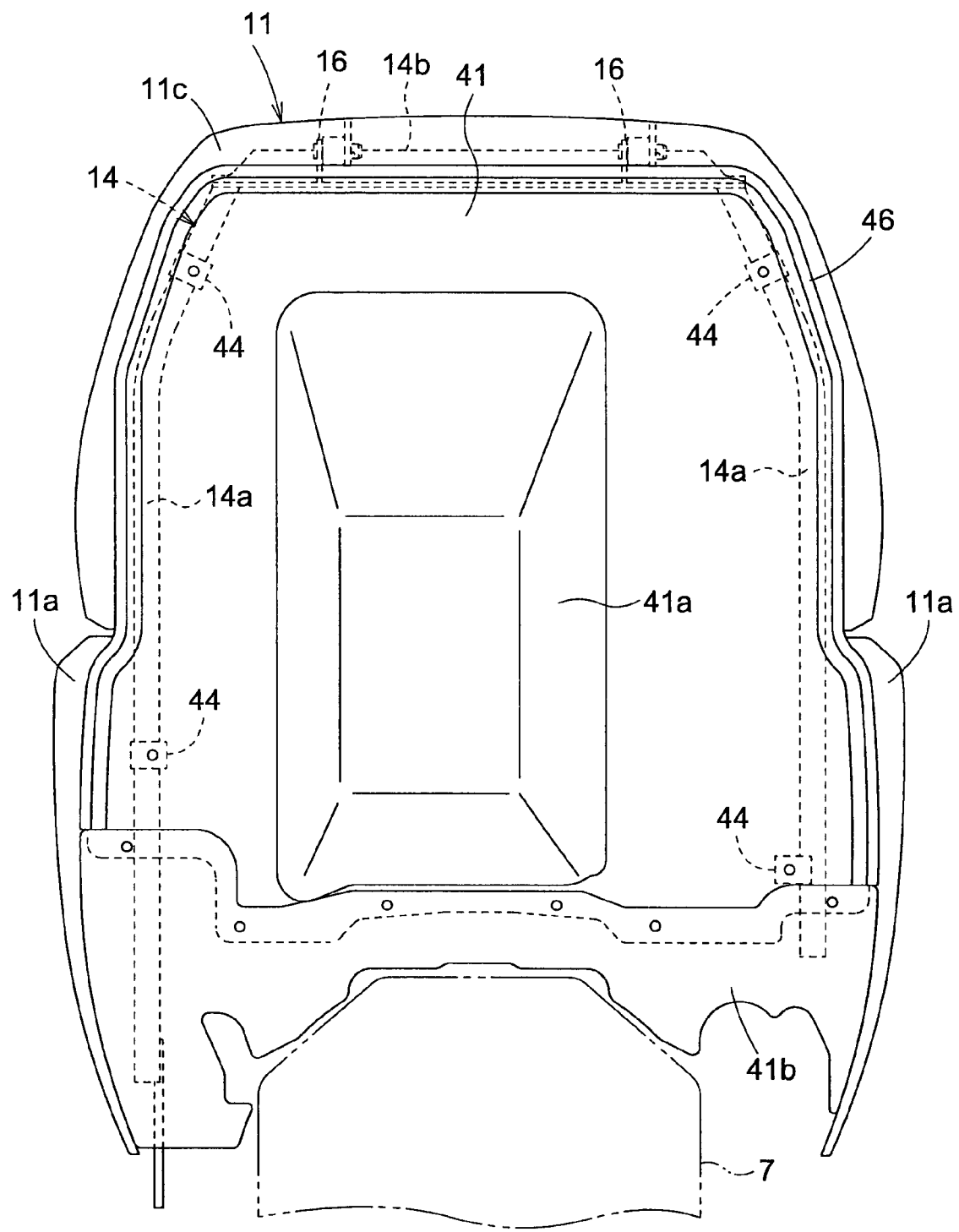
FIG. 4 is a rear view showing a sound insulating plate disposing portion of the engine section.

As shown in FIGS. 4 and 5, the engine section side sound insulating wall 41 includes a sealing member 46 attached to a peripheral edge of the engine section side sound insulating wall 41, so that this sealing member 46 seals between the engine section side sound insulating wall 41, the upper hood 11c and the lower hood 11a. That is, the engine section side sound insulating wall 41 closes a rearward opening 11d of the engine hood 11 so as to restrict noise transmission from the rearward opening 11d of the engine hood 11 to the outside. The engine section side sound insulating wall 41 includes a bulging portion 41a formed to project rearward relative to the vehicle body at a center of this engine section side sound insulating wall 41 relative to the vehicle body. This bulging portion 41a serves to avoid interference between the engine section side sound insulating wall 41 and a portion 13a of the fuel tank 13 projecting rearward relative to the vehicle body from the rear engine hood support frame 14. As shown in FIGS. 4 and 5, the engine section side sound insulating wall 41 includes an extension plate 41b extending downward relative to the vehicle body from the lower end of the engine side sound insulating wall 41. The extension plate 41b covers the space between the lower hoods 11a and the transmission case 7.

A gap 43 between the engine side sound insulating wall 41 and the cabin side sound insulating wall 42 is provided over the entire surface of the engine side sound insulating wall 41. This gap 43 is open to the outside of the cabin 20 over the entire perimeter of the engine hood 11. Namely, the gap 43 is intended to damp and relieve noise which may be transmitted from the engine section side sound insulating wall 41 to the cabin 20.

The cabin side sound insulating wall 42 of the cabin 20 includes an iron plate 47 as a first plate connected to a frame member 21a of the front wall 21, a rubber plate 48 as a second plate provided on the outer side of this iron plate 47, i.e. on the side facing the engine section side sound insulating wall 41, and a gap 49 provided between the rubber plate 48 and the iron plate 47. The gap 49 is formed by a spacer 50 attached by a connecting pin affixing the rubber plate 48 to the iron plate 47 and is formed over the entire surface of the rubber plate 48. Namely, the cabin side sound insulating wall 42 restricts noise transmission to the cabin 20 through damping or relief of transmission of noise by the iron plate 47, the rubber plate 48 and the gap 49.

The first plate can be formed of any other metal than iron or even resin. The rubber plate 48 as the second plate too can be formed of an iron plate, any other metal or resin.

What is claimed is:

1. A tractor comprising:
   a plurality of wheels;
   a vehicle body frame supported by the wheels;
   an engine supported by the vehicle body frame;
   an engine hood for covering the engine;
   a cabin disposed rearwardly of the engine hood;
   an engine hood support frame for supporting the engine hood wherein a gap is formed between the engine hood and the cabin and a gap is formed between the engine hood support frame and the cabin;
   an engine side sound insulating wall closing a rearward opening of the engine hood;
   a cabin side sound insulating wall provided to the cabin in opposition to the engine side sound insulating wall wherein the engine side sound insulating wall and the cabin side sound insulating wall defining a gap therebetween which opens to exterior space outside the cabin.

2. The tractor according to claim 1, wherein said cabin side sound insulating wall includes a first plate and a second plate which are located next to each other in a direction of a thickness of the cabin side sound insulating wall, the first plate and the second plate forming a gap therebetween.

3. The tractor according to claim 2, wherein said gap between the first plate and the second plate is communicated with the exterior space outside said cabin.

4. The tractor according to claim 1, further comprising a sealing member provided along the perimeter of said engine side sound insulating wall for sealing a gap between the engine hood and the engine side sound insulating wall.

5. The tractor according to claim 1, wherein said engine side sound insulating wall has a recess for a fuel tank, and said cabin side sound insulating wall has a recess having a shape corresponding to said recess of the engine side sound insulating wall.

* * * * *